(12) United States Patent
Yaseen et al.

(10) Patent No.: US 7,756,957 B2
(45) Date of Patent: Jul. 13, 2010

(54) END-TO-END GOVERNED DATA TRANSFERS IN A NETWORK

(75) Inventors: Nimer Yaseen, Allen, TX (US); Charlie Stevens, Hurst, TX (US); Li Mo, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 2828 days.

(21) Appl. No.: 09/978,432

(22) Filed: Oct. 15, 2001

(65) Prior Publication Data
US 2002/0194321 A1 Dec. 19, 2002

Related U.S. Application Data

(60) Provisional application No. 60/295,148, filed on Jun. 1, 2001.

(51) Int. Cl.
 G06F 15/173 (2006.01)
 G01R 31/08 (2006.01)
(52) U.S. Cl. .................. 709/223; 709/225; 370/229; 370/240
(58) Field of Classification Search ................. 709/223, 709/225, 203; 370/229–240
 See application file for complete search history.

(56) References Cited

U.S. PATENT DOCUMENTS

| | | | |
|---|---|---|---|
| 5,432,783 A * | 7/1995 | Ahmed et al. ................ | 370/397 |
| 6,163,527 A | 12/2000 | Ester et al. | |
| 6,628,609 B2 * | 9/2003 | Chapman et al. ............. | 370/229 |
| 6,778,498 B2 * | 8/2004 | McDysan .................... | 370/231 |
| 6,778,531 B1 * | 8/2004 | Kodialam et al. ........... | 370/390 |
| 2002/0018264 A1 * | 2/2002 | Kodialam et al. ........... | 359/128 |
| 2002/0107908 A1 * | 8/2002 | Dharanikota ................ | 709/203 |
| 2004/0037223 A1 * | 2/2004 | Harrison et al. ............. | 370/235 |

OTHER PUBLICATIONS

World Wide Web, http://www.cis.ohio-state.edu/~jain/cis788-97/virtual_lans/index.htm, Suba Varadarajan, "Virtual Local Area Networks", printed on Feb. 7, 2000, 12 pages.
World Wide Web, http://www.ieff.org/internet-drafts/draft-ietf-mpls-arch-07.txt, Eric C. Rosen, "Multiprotocol Label Switching Architucture", printed on Jan. 9, 2001, 55 pages.

(Continued)

*Primary Examiner*—George C Neurauter, Jr.
*Assistant Examiner*—Asghar Bilgrami
(74) *Attorney, Agent, or Firm*—Gardere Wynne Sewell LLP; Marc A. Hubbard

(57) ABSTRACT

A system and method for providing quality of service guarantees in a packet-switched network is provided. A network including nodes linked together by communication links includes a management node for governing the performance of the nodes. Ingress and egress rate restrictions are defined at the nodes and the management module may disallow a portion of a requested transmission to a node if the requested transmission would result in a violation of one of the ingress and egress rate restrictions. Disallowance of a requested transmission may be made by the management node if either an ingress rate restriction of the transmitting node or an egress of the receiving node would be violated by allowance of the requested transmission.

14 Claims, 2 Drawing Sheets

OTHER PUBLICATIONS

World Wide Web, http://www.ieff.org/internet-drafts/draft-ietf-mpls-generalized-rsvp-te-00Peter Ashwood-Smith, et al., "Generalized MPLS Signaling -RSVP-TE Extensions", printed on Jan. 9, 2001, 19 pages.

Yates, Jennifer, et al., "Reconfiguration in IP Over WDM Access Networks", AT&T Labs—AT&T Shannon Laboratories, 4 pages.
Copyright 2000 by the Institute of Electrical and Electronics Engineers, Inc., "Local and Metropolitan Area Networks", IEEE Standard for Information technology, published Oct. 16, 2000, pp. 40-50.

* cited by examiner

HOSE 40
ICR 15 μb/s; IPR 20 μb/s

PIPE 50
ICR 20 μb/s; IPR 25 μb/s

END-TO-END GOVERNED DATA TRANSFERS IN A NETWORK

This application claims priority to U.S. Provisional Application No. 60/295,148 filed Jun. 1, 2001 entitled, "End-to-End Governed Data Transfers in a Network."

TECHNICAL FIELD OF THE INVENTION

This invention relates to network technologies, and more particularly, to a system and method for governing transmission and reception of data in a network to ensure a guaranteed quality of service.

BACKGROUND OF THE INVENTION

Real-time delivery of media, and other data intensive services, over the Internet has great commercial potential but has thus far found little market acceptance. Most streaming media and other forms of real-time multimedia delivery such as video conferencing are presently fringe offerings and suffer unacceptable quality to elicit payment by subscribers to such services. The recent proliferation of high bandwidth end-user equipment, such as digital subscriber line technologies and cable modems, demonstrates the consumer demand for broadband services. Increasing market acceptance of virtual private networks demonstrates corporate desires of economical, high-performance private networking. Even with high speed subscriber connections to the Internet, users generally find real-time high bandwidth media offerings provided over the Internet to be of dramatically lower quality than traditional media, e.g. telecast, cable, satellite, etc. Improved quality of streaming media and other real-time applications are being made as telecommunication carriers upgrade backbone and switching networks. However, some quality problems with respect to quality of service deliverable over the Internet is inherent in the Internet Protocol (IP) itself. Particularly, the Internet relies on a best effort packet switching network layer. Thus, media transmissions made over the Internet are susceptible to losses or delays due to preemptive, higher priority transmissions. Latency issues are a primary concern when dealing with the quality of Internet delivered media.

Various protocols have been designed and have addressed different quality of service needs. One of the most well known and widely adopted is the asynchronous transmission mode (ATM) protocol. ATM is a connection orientated technology that can integrate voice, video and data into packets (also called cells). Because it is connection oriented, any data having a common origination and destination will be transmitted over the same path. While this may present problems, such as a path outage due to a node failure, quality of service guarantees can be implemented in ATM over specific paths.

SUMMARY OF THE INVENTION

It may be seen from the foregoing that a system and method for providing quality of service guarantees in a connectionless, or packet-switched network, such as the Internet, that uses a best effort delivery mechanism is desirable. In accordance with an embodiment of the present invention, a network including nodes linked together by communication links includes a management node for governing the performance of the nodes. Ingress and egress rate restrictions are defined at the nodes and the management module may disallow a portion of a requested transmission to a node if the requested transmission would result in a violation of one of the ingress and egress rate restrictions. Disallowance of a requested transmission may be made by the management node if either an ingress rate restriction of the transmitting node or an egress rate restriction of the receiving node would be violated by allowance of the requested transmission.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
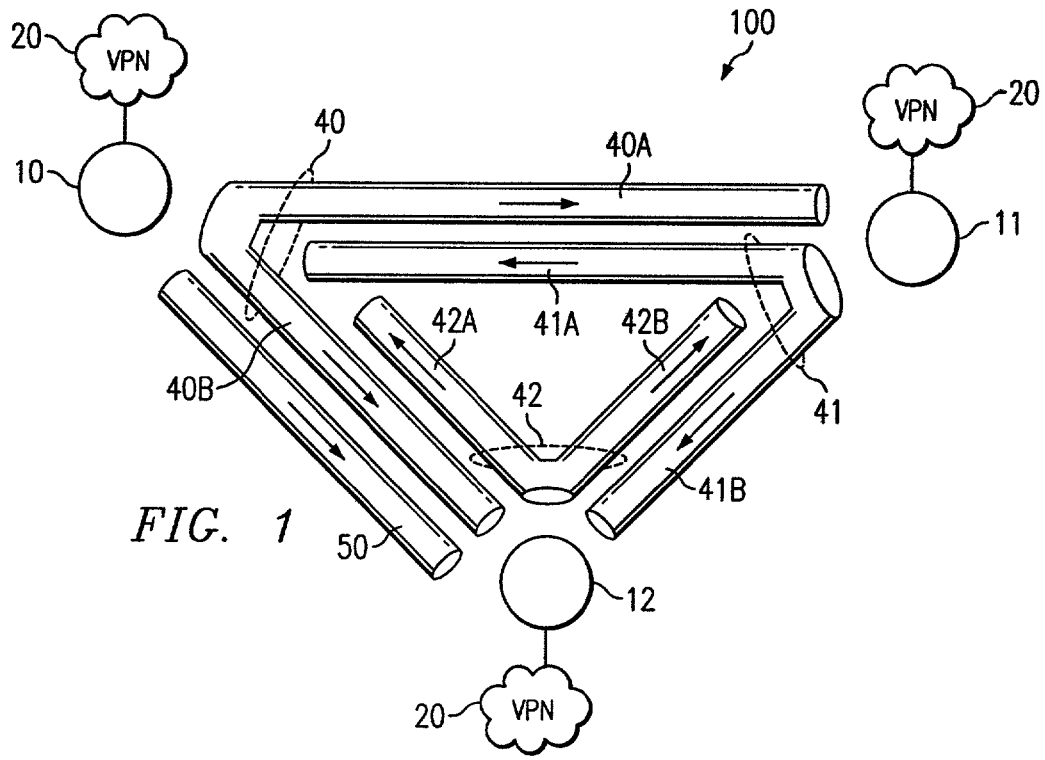
FIG. 1 is a simplified diagram of a network having mesh-connected nodes in which virtual private networks may be serviced.
Figure 2:
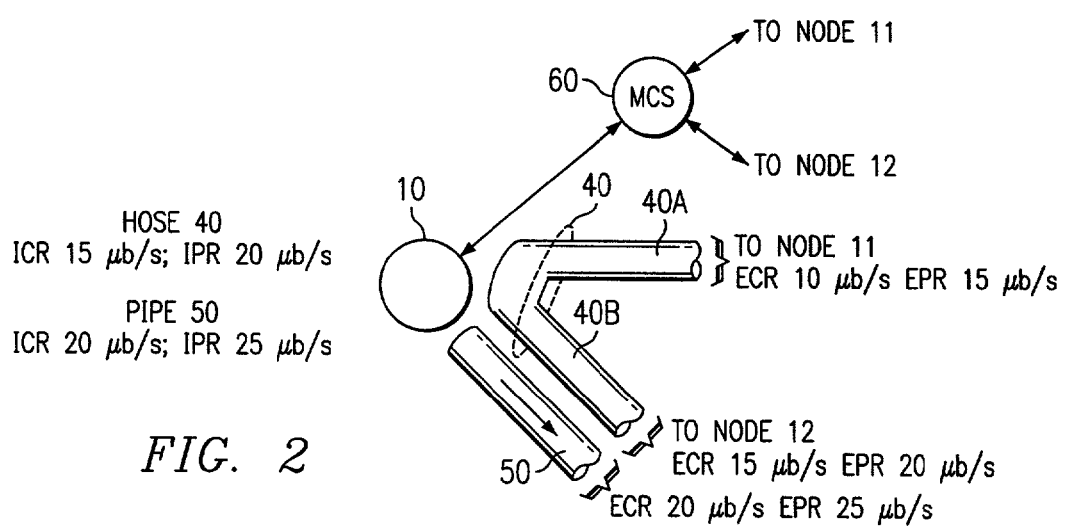
FIG. 2 is a simplified diagram of a node of the network of FIG. 1 illustrating various communication channels for transmitting and receiving data to and from other nodes of the network.
Figure 3:
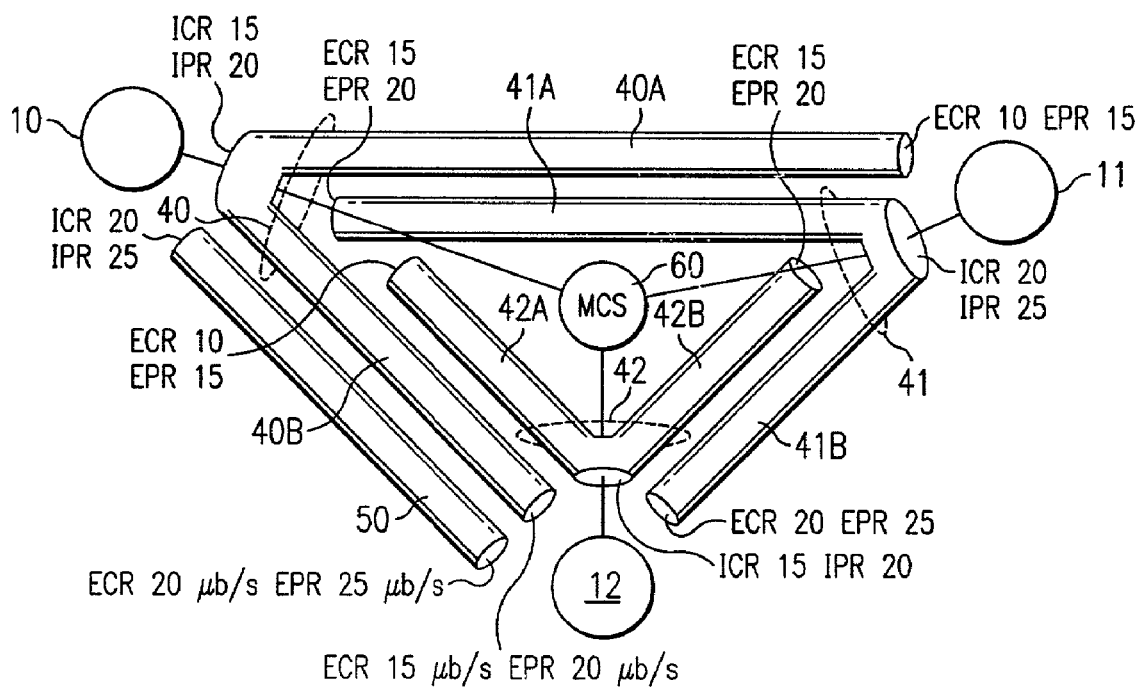
FIG. 3 is a simplified diagram of a network having mesh-connected nodes and including a management and control system node for governing data transmissions and receptions in the network according to the teachings of the present invention.

The preferred embodiment of the present invention and its advantages are best understood by referring to FIGS. 1 through 3 of the drawings, like numerals being used for like and corresponding parts of the various drawings.

In FIG. 1, there is illustrated an exemplary network 100 including nodes 10-12 interconnected by communication paths. The network is preferably a packet-switched network operable to deliver packetized data between nodes thereof in an appropriately formatted protocol, e.g. the Internet protocol (IP), User Datagram Protocol (UDP), etc. Network 100 may be implemented using any suitable transmission technology. In one embodiment, network 100 is a fiber optic network carrying IP formatted data therein and, accordingly, nodes 10-12 may be implemented as optical transport network nodes although the particular transmission medium is irrelevant with regard to the scope of the invention. The network 100 is generally an "unsecured" network, that is, it is a public network. While the present invention contemplates an implementation on an optical network, the invention as described herein is not intended to be limited thereto and, accordingly, network 100 may be any type of network capable of packet-switched data transmissions between various nodes 10-12 thereof.

Communication paths connecting nodes in network 100 are one of two general types: "pipes" and "hoses". A Pipe is defined herein as uni-directional point-to-point communication link, or channel, between two nodes and is operable to provide uni-directional communication transmitted from an ingress node and received by an egress node that terminate the pipe. As shown in FIG. 1, a pipe 50 connects nodes 10 and 12. A hose is defined herein as a bi-directional communication path that allows point-to-multipoint communication between a medial node and other nodes terminating communication mediums of the hose and is thus an interconnection between three or more nodes. For example, a hose 40 provides a point-to-multipoint connection between medial node 10 and nodes 11 and 12. Likewise, hose 41 provides a point-to-multipoint connection between medial node 11 and nodes 10 and 12 and hose 42 provides a point-to-multipoint connection between medial node 12 and nodes 10 and 11. Each hose includes at least two communication mediums such as an optical fiber each terminated by two nodes. For example, hose 40 includes communication mediums 40A and 40B. Communication medium 40A is terminated by nodes 10 and 11. Communication medium 40B is terminated by nodes 10 and 12. Communication mediums 40A and 40B, in combination, define hose 40. Likewise, hoses 41 and 42 respectively include communication mediums 41A-41B and 42A-42B. While each hose 40-42 is illustrated as distinct, it should be understood that one or more hoses may share a communication medium. For example, communication mediums 40A and 41A of hoses 40 and 41 may be allocated on a common optical fiber or may be provided on separate physical communication mediums.

A virtual private network (VPN) 20 may be provided in network 100 for facilitating secure connections through the otherwise unsecured network 100. For example, VPN 20 is serviced by nodes 10-12. VPN 20 connections may be secured through any number of well known techniques, for example by encrypting VPN communications at both ends by firewall software, within routers, etc. The present invention provides a mechanism for providing quality of service (QoS) guarantees to subscribers accessing network 100 via nodes 10-12, for example a customer having a VPN 20 subscription, by implementing data egress and ingress rate restrictions or limits at each node and tracking the data egress, that is data entering a particular node, and ingress, that is data transmitted out of a particular node, attributable to the VPN 20.

The present invention implements performance qualities, for example egress and ingress committed and peak flow restrictions, at each site, or node, associated with a VPN. Furthermore, performance qualities may be uniquely defined at each node for each type of communication path available thereto, that is performance qualities may be independently defined for transmissions made over pipe 50 or hose 40-42 of network 100.

In FIG. 2, there is shown a portion of network 100. Particularly, node 10 and hose 40 and pipe 50 available thereto are shown. An egress flow restriction is defined for each node over a particular communication path such as hose 40 and pipe 50 to any other node terminating the particular communication medium. Furthermore, minimum (committed) and maximum (peak) transmission rates may be defined for both egress and ingress directions for pipes and hoses. As an example, node 10 has a ingress committed rate (ICR) of 15 Mb/s and an ingress peak rate (IPR) of 20 Mb/s for transmissions by node 10 over hose 40. Likewise, nodes 11 and 12 respectively terminating communication mediums 40A and 40B of hose 40 will have egress restrictions for receptions thereby. For example, node 11 has an egress committed rate (ECR) of 10 Mb/s and an egress peak rate (EPR) 15 Mb/s defined for data receptions over communication medium 40A of hose 40. Similarly, node 12 has an ECR of 15 Mb/s and an EPR of 20 Mb/s for data receptions over communication medium 40B of hose 40. A management node 60 may be in communication with node 10 as well as any other nodes within network 100 and functions to monitor egress and ingress data flows from the nodes and to ensure none of the set egress and ingress restrictions (ICR, IPR, ECR and EPR) are violated.

Ingress and egress restrictions may be defined for nodes terminating a point-to-point communication path, for example pipe 50, in a manner similar to the ingress and egress restrictions defined for nodes 10-12 of hose 40. In the example, node 10 has an ICR of 20 Mb/s and an IPR of 25 Mb/s defined for data transmissions over pipe 50. Node 12 has an ECR of 20 Mb/s and an EPR of 25 Mb/s defined for data transmissions over pipe 50. Egress and ingress restrictions may be similarly made at each node terminating a communication path in network 100 so that all data flows over hoses 40-42 and pipe 50 have restrictions placed thereon.

In FIG. 3, there is illustrated network 100 with exemplary egress and ingress restrictions defined for all nodes 10-12 at hoses 40-42 and pipe 50. Exemplary ingress and egress restrictions are provided below in Table A.

TABLE A

| node | ICR (Mb/s) | IPR (Mb/s) | ECR (Mb/s) | EPR (Mb/s) |
|---|---|---|---|---|
| HOSE 40 | | | | |
| 10 | 15 | 20 | | |
| 11 | | | 10 | 15 |
| 12 | | | 15 | 20 |
| HOSE 41 | | | | |
| 10 | | | 15 | 20 |
| 11 | 20 | 25 | | |
| 12 | | | 20 | 25 |
| HOSE 42 | | | | |
| 10 | | | 10 | 15 |
| 11 | | | 15 | 20 |
| 12 | 15 | 20 | | |
| PIPE 50 | | | | |
| 10 | 20 | 25 | | |
| 12 | | | 20 | 25 |

As illustrated and summarized in TABLE A, each node has ingress and egress rate restrictions defined for each communication path available at that particular node. Preferably, these rates are maintained and associated with a particular port of the node associated with a particular subscriber of network 100, for example a subscriber having a VPN 20 serviced by the network 100. Egress and ingress transmission qualities are monitored on a per node basis. For example, an exemplary ICR defined as 15 Mb/s on hose 40 at node 10 for a subscriber operating VPN 20 specifies that VPN 20 has a committed, or reserved, data rate of 15 Mb/s for transmitting data from node 10 over the hose 40 to any other node having access to the hose 40, in this case both nodes 11 and 12. Therefore, a totality of 15 Mb/s of bandwidth is reserved at all times for transmissions from medial node 10 to nodes 11 and 12 over hose 40. Notably, this reserved, or committed, bandwidth may be dynamically allocated over the various communication mediums 40A and 40B of hose 40. For example, an ICR of 15 Mb/s at node 10 may be consumed by a data transmission of 15 Mb/s to node 11 from node 10 over medium 40A of hose 40. Alternatively, the ICR of 15 Mb/s at node 10 may be consumed by a data transmission of 15 Mb/s to node 12 from node 10 over medium 40B of hose 40. The ICR of 15 Mb/s at node 10 may be consumed by a combined transmission of 15 Mb/s to nodes 11 and 12 respectively transmitted over communication channels 40A and 40B of hose 40 as well. Accordingly, an ingress restriction for a medial node of a hose represents a cumulative data rate restriction for transmissions from the medial node over the two or more communication mediums of the hose.

An IPR defines a peak, or maximum, data transmission rate from a particular node at any given instance. An IPR allows data transmissions in excess of a committed rate when channel capacity allows. In other words, an ingress peak rate is not guaranteed at any particular moment but rather, it allows transmissions to be made in excess of an ingress committed rate if ingress channels to the particular node have available capacity.

Egress rates are defined in a similar manner as ingress rates. An exemplary ECR defined as 10 Mb/s on hose 40 at node 11 for a subscriber operating VPN 20 specifies that VPN 20 has a committed, or reserved, egress data rate of 10 Mb/s for receiving data over hose 40, in this case from node 10. Therefore, a totality of 10 Mb/s of bandwidth is reserved at all times for transmissions from node 10 to node 11 over hose 40. Accordingly, an egress restriction for a terminating node of a hose represents a data rate restriction for transmissions from the medial node to the terminating node.

An EPR defines a peak, or maximum, data transmission rate to a particular node at any given instance. An EPR allows data transmissions in excess of a egress committed rate when channel capacity allows. In other words, an egress peak rate is not guaranteed at any particular moment but rather, it allows transmissions to be made in excess of an egress committed rate if channels connected to the particular node have available capacity.

Similar to the ingress and egress rate restrictions established at nodes terminating communication mediums of a hose, ingress and egress limits may be also placed on a pipe terminated by nodes. In the illustrated example, nodes 10 and 12 terminate a point-to-point communication path, that is pipe 50. Egress and ingress committed and peak rates are defined for nodes 10 and 12 terminating pipe 50.

A management node 60 is connected with and provides performance monitoring and management of nodes 10-12 of network 100. Management node 60 preferably includes a table or other storage component for maintaining service specifications related to nodes 10-12 of network 100 and any communication channels terminated at each node. Thus, the various ingress and egress rate restrictions specified at nodes 10-12 for hoses 40-42 and pipe 50 specifying quality of service performance at nodes 10-12 are maintained within management node 60. A transmission request that, if allowed, would result in violation of an ingress and/or an egress restriction at either the ingress or egress end of a communication medium may be disallowed to ensure quality of service guarantees. For example, a request to send data transmissions from node 10 to node 11 over hose 40 at a rate of 11 Mb/s may result in disallowance of 1 Mb/s from the transmission stream because the requested data transmission is in excess of the ECR of node 11 for transmissions on hose 40. In such a case, however, the transmission may take place because the EPR of node 11 is greater than the requested transmission rate. Allowance or disallowance of the transmission may be determined by the overall capacity of hose 40. In other words, a requested transmission to an egress node in excess of the ECR of the egress node defined for a particular communication path but below the EPR of the egress node over the particular communication path may be allowed. Allowance or disallowance of the requested data transmission may be further dependent on the ingress rate restriction defined for the particular communication path at the node (or nodes) from which the requested transmission (or transmissions) is made. For example, a requested transmission of 11 Mb/s from node 10 on hose 40 to node 11 would be in excess of the ECR of node 11. Therefore, disallowance of up to 1 Mb/s of the requested transmission may be made. However, because the requested transmission is below the EPR of node 11, the full 11 Mb/s transmission may be made if hose 40 has available capacity and node 11 is not currently receiving data at its full egress peak rate defined for transmissions to node 11 over hose 40, in this case up to 15 Mb/s. Accordingly, a request for a data transmission over a particular communication path from a transmitting node in excess of the EPR of that particular node defined for the communication path will result in disallowance of, at a minimum, a portion of the requested transmission by the amount the request exceeds the EPR defined for the receiving node over the communication path and, at a maximum, by the amount the request exceeds the ECR defined for the receiving node over the communication path. Likewise, a data transmission to a node in excess of the IPR defined for the transmitting node over that particular communication path will result in disallowance of, at a minimum, a portion of the requested transmission by the amount the request exceeds the IPR defined for the transmitting node over the particular communication path and, at a maximum, by the amount the request would cause the total transmission rate to exceed the ICR of the transmitting node.

Quality assurances are also facilitated by transmission monitoring performed by the management node. When a node transmits data to another node, the management node monitors the attempted transmission at the transmitting node and the data reception that occurs at the receiving node of the transmission. An exemplary arrangement includes data volume counting at both the transmitting node and the receiving node. In a packet network, the management node may count packets transmitted out of a node over a particular communication medium and subsequently count the packets received over the same communication medium at the receiving node. By maintaining an accounting mechanism, origination data can be compared with received data over any communication path between nodes 10-12 within network 100.

As described, a network including nodes linked together by communication links and operable to perform packet-switching includes a management node for governing the performance of the nodes is provided. Ingress and egress rate restrictions are defined at channels of the nodes for limiting the amount of data that may be transferred from and to the nodes over the communication paths for which the restrictions are defined. Communication paths may include point-to-point links as well as point-to-multipoint links. Committed data rates define minimum network capacity that is available within the network at all times. Peak rates are also defined for providing an upper limit on the rate of transfers on a particular communication path that is in excess of the committed rates. A management node governs transfers into and out of the nodes of the network and monitors data rates over the communication channels of the nodes. Requests for data transfers in excess of the ingress or egress rate restrictions may result in the management node directing the transmitting node to drop a portion of the requested data transfer. Accordingly, an operator of a network may provide subscription services, such as a VPN, to subscribers and provide quality of services guarantees by making available only such guarantees that are within the overall network infrastructure capabilities. Numerous such VPNs may be provided within the network—the cumulative guaranteed quality of services being provided by limiting the totality of these guarantees to the overall network 100 infrastructure capabilities.

While the invention has been particularly shown and described by the foregoing detailed description, it will be understood by those skilled in the art that various changes, alterations, modifications, mutations and derivations in form and detail may be made without departing from the spirit and scope of the invention. For example, while the communication mediums described have been unidirectional, the present invention may be applied in a network having pipes and/or hoses with bi-directional communication mediums. Furthermore, the ingress and egress restrictions described have illustratively defined limitations on a particular medium of a hose or pipe. However, the ingress and egress restrictions may be defined for a plurality of pipes or a plurality of hoses as well.

It is contemplated that the ingress and egress restrictions described may be associated with a particular port of a node, thus allowing the described ingress and egress restrictions to limit data flows from a combination of pipes and hoses that terminate at a common port, or a common set of ports.

What is claimed is:

1. A network comprising:

a first node and a second node having at least one communication channel interconnecting the nodes, the first node and the second node each having at least one ingress rate restriction for data transfers from the respective node over the at least one communication channel, and at least one egress rate restriction for data transfers to the respective node on the at least one communication channel; and a management node having communication channels with at least one of the plurality of nodes, the management node being operable to disallow at least a portion of a requested transmission from the first node to the second node when one of the ingress and egress rate restrictions of the first or second node is violated by the requested transmission.

2. The network according to claim 1, wherein the network is the Internet.

3. The network according to claim 1, wherein the first node and the second node are optical transport network nodes.

4. The network according to claim 1, wherein the at least one communication channel is a fiber optic link.

5. The network according to claim 1, wherein the at least one egress rate restriction includes a egress committed rate defining a minimum transfer rate reserved in the network for transfers to the respective node and an egress peak rate defining a maximum transfer rate allowable in the network for transfers to the respective node, and the at least one ingress rate restriction includes an ingress committed rate defining a minimum transfer rate reserved in the network for transfers from the respective node and an ingress peak rate defining a maximum transfer rate allowable in the network for transfers from the respective node.

6. The network according to claim 1, wherein the at least one communication channel is a point-to-point communication channel.

7. The network according to claim 1, wherein the at least one communication channel is a point-to-multipoint communication channel.

8. The network according to claim 1, wherein an allowed transmission from the first node to the second node includes either the requested transmission or a portion thereof the management node monitoring transmission from the first node to the second node.

9. A method of transmitting packet-switched data in a network having a plurality of nodes therein, the method comprising the steps of: defining an ingress rate restriction for each of at least two nodes of the plurality of nodes, the ingress rate restriction limiting the amount of data that may be transmitted from the respective node on at least one channel of the network; defining an egress rate restriction for each of the at least two nodes of the plurality of nodes, the egress rate restriction limiting the amount of data that may be transmitted to the respective node on the at least one channel of the network; monitoring the amount of data transmitted from and to a first node; and disallowing at least a portion of one of an attempted data transfer from and to the first node when one of the respective ingress rate restriction and egress rate restriction would be violated by the attempted data transfer, wherein defining the at least one egress rate restriction further includes defining an egress committed rate that defines a minimum transfer rate reserved in the network for transfers to the respective node from the plurality of nodes and defining an egress peak rate that defines a maximum transfer rate allowable in the network for transfers to the respective node from the plurality of nodes, and defining the at least one ingress rate restriction further includes defining an ingress committed rate that defines a minimum transfer rate reserved in the network for transfers from the respective node to the plurality of nodes and defining an ingress peak rate that defines a maximum transfer rate allowable in the network for transfers from the respective node to the plurality of nodes.

10. The method according to claim 9, wherein the network is the Internet.

11. The method according to claim 9, wherein the at least two nodes are optical transport network nodes.

12. The method according to claim 9, wherein the at least one channel is a fiber optic link.

13. The method according to claim 9, wherein the at least one channel is a point-to-point communication channel terminated at respective ends by the at least two nodes.

14. The method according to claim 9, wherein the at least one channel is a point-to-multipoint communication channel.

* * * * *